United States Patent [19]
Yasui et al.

[11] Patent Number: 5,211,967
[45] Date of Patent: May 18, 1993

[54] THREE-DIMENSIONAL FABRIC AND METHOD OF PRODUCING THE SAME

[75] Inventors: Yoshiharu Yasui; Meiji Anahara; Masaaki Amano, all of Kariya, Japan

[73] Assignee: Kabushiki Kaisha Toyoda Jidoshokki Seisakusho, Kariya, Japan

[21] Appl. No.: 849,748

[22] Filed: Mar. 12, 1992

[30] Foreign Application Priority Data

Mar. 15, 1991 [JP] Japan .................................. 3-51479
Mar. 15, 1991 [JP] Japan .................................. 3-51480

[51] Int. Cl.$^5$ .............................................. D03D 3/00
[52] U.S. Cl. ..................................... 428/225; 28/140; 28/149; 28/151; 139/11; 139/384 R; 139/DIG. 1; 428/257
[58] Field of Search .................. 428/225, 257; 139/11, 139/384 R, DIG. 1; 28/140, 149, 151

[56] References Cited

U.S. PATENT DOCUMENTS

| | | | |
|---|---|---|---|
| 5,024,874 | 6/1991 | Yasui et al. | 428/224 |
| 5,091,246 | 2/1992 | Yasui et al. | 428/224 |
| 5,121,530 | 6/1992 | Sakatani et al. | 428/225 |
| 5,126,190 | 6/1992 | Sakatani et al. | 428/225 |
| 5,130,188 | 7/1992 | Anahara et al. | 428/225 |

FOREIGN PATENT DOCUMENTS 1292162  11/1989  Japan .

Primary Examiner—James J. Bell
Attorney, Agent, or Firm—Brooks Haidt Haffner & Delahunty

[57] ABSTRACT

A three-dimensional fabric is disclosed that is appropriate for use in composite materials having various beam type shapes that are formed from a plurality of intersecting plate sections. A plurality of thread layers are woven such that they extend continuously through and between a pair of adjacent plate sections. The thread layers respectively include threads that are woven in at least two independent planar directions. The thread layers are bound together by transverse threads. When a load is applied to a plate section of a composite having this three-dimensional fabric as a frame member, the threads that extend continuously from a first plate section to a second plate section effectively receive the stress acting on the junction of the plate sections. The strength of the composite is therefore enhanced.

18 Claims, 16 Drawing Sheets

THREE-DIMENSIONAL FABRIC AND METHOD OF PRODUCING THE SAME

BACKGROUND OF THE INVENTION

1. Field of the Invention

The present invention relates to a three-dimensional fabric suitable for use as a frame member of a composite that has an irregular, non-rectangular cross section, such as L shape, I shape, T shape or H shape, and a method of producing the same.

2. Description of the Related Art

Composite materials having three dimensional fabrics as their frame members are expected to be widely used as structural materials for various products including rockets, aircraft, automobiles, marine vessels and buildings. One common fabric structure is an orthogonal three-axis, three-dimensional fabric that includes three kinds of threads (X,Y and Z directional threads). Another is a five-axis three-dimensional fabric that includes oblique threads that extend in the lengthwise direction in addition to the perpendicular three axes. To ensure a variety of applications of a composite having a three-dimensional fabric as the frame member, it is sometimes necessary that the three-dimensional fabric have an irregular, non-rectangular cross section, such as L shape, I shape, T shape or H shape, depending on the actual usage.

A conventional three-dimensional fabric having an irregular cross section is disclosed in Japanese Unexamined Patent Publication No. 1-292162. This three-dimensional fabric includes at least two plates connected together by fabric threads. One or more of the plates includes threads that extend in three independent directions. Specifically, the longitudinal, lateral and transverse directions. This is referred to as a three-axis three dimensional fabric. At least one plate further includes two additional types of threads. That is, two types of oblique threads that extend in a direction oblique to the direction of the arrangement of the lengthwise and horizontal fabric threads and intersecting each other, thereby providing a five-axis fabric arrangement.

One such design is shown in FIG. 1. As seen therein, a three-dimensional fabric with an H-shaped cross section includes a first plate 31 as a base and four second plates 32 formed integrally and perpendicular to the plate 31. The plates 31 and 32 are linked by the transverse threads.

In producing this three-dimensional fabric, first thread guide pipes G1 and second thread guide pipes G2 are provided upright in a predetermined pattern. A layer consisting of fabric threads arranged in the X and Y directions is then laid on that portion of the bottom of the first plate 31 where the first guide pipes G1 are provided. Thereafter, a plurality of full fabric layers are woven through both sets of pipes G1 and G2. The full fabric layers include threads arranged in the X direction, Y direction and oblique directions. Subsequently, a layer consisting of threads extending in the X and Y directions is laid on top in the region of the first plate 31 where the first guide pipes G1 are provided. Next, fabric threads are inserted in the individual guide pipes G1 and G2 in a loop form so that they replace the guide pipes G1 and G2. A tack thread is inserted into each loop as a stopper. As a result, the individual layer portions are coupled by fabric threads extending in the Z direction, yielding a three-dimensional fabric with an H-shaped cross section.

The three-dimensional fabric does not have any threads which extend continuously through a bend into two perpendicularly-crossing planes. That is, none of the threads in the fabric shown in FIG. 1 which are arranged so as to be continuous to the X-Y plane and Y-Z plane. Therefore, when a stress is applied to the second plate 32 in the direction and location of arrow Q, the fabric threads in the X-Y plane of the first plate 31 carry very little of the bending stress acting on the second plate 32. In other words, the fabric threads of the X-Y plane of the first plate 31 do not effectively work to carry the loads applied to the second plate 32. Accordingly, composites using this three-dimensional fabric have the drawback of having insufficient strength.

SUMMARY OF THE INVENTION

It is therefore an object of the present invention to provide a three-dimensional fabric which can enhance the strength of joints when the fabric is used as a frame member of a composite which is shaped by a plurality connected plate sections, thereby improving the hardness (durability) against the tensile loads and compression loads.. Representative applications include beam members having an irregular cross section, such as L shape, I shape, or T shape.

Another independent object of the present invention to provide a method of easily producing a T-shaped join in a three-dimensional fabric.

To achieve the first object, a three-dimensional fabric embodying the present invention includes at least two plate like sections arranged in intersecting planes so as to define a bend at the intersection of the plate sections. A plurality of thread layers are woven such that they extend continuously through and between the plate sections. The portions of the thread layers within each plate section extend in planes that are perpendicular to a transverse direction that passes through the corresponding plate section. The plurality of thread layers including threads that are woven in at least two independent directions. At least one transverse thread is woven through the thread layers in the transverse direction of the corresponding plate sections to couple the thread layers together.

When a load is applied to a plate section of a composite having this three-dimensional fabric as a frame member, the threads that extend continuously from a first plate section to a second plate section effectively receive the stress acting on the junction of the plate sections. The strength of the composite is therefore enhanced.

In a preferred embodiment, the threads used in the thread layers of each plate section are woven in four different directions, which resultants in a three-dimensional fabric directions, which resultants in a three-dimensional fabric having a five-axis in every plate section. The resultant structure has better resistance to oblique stresses, compared with a composite using a perpendicular three-axis. The composite according to the present invention can therefore show sufficient strength not only against the tensile and compression loads, but also against twisting loads.

To achieve the second object, a method of forming a T-shaped joint in a three-dimensional fabric is disclosed. The method contemplates using a pair of frame members having L-shaped portions and a frame member having a flat portion. Each of the frame members is provided with a matrix of removable regulating members that extend perpendicularly from an active surfaces thereof. Threads are then woven between the regulating members of each frame member in at least two independent directions to form a thread layer having at least a two axis arrangement on each frame member. The L-shaped members being woven such that their two axis thread layer extends continuously through the bend in the L-shaped member. The thread layers together with their regulating members are then removed from their respective frames. The woven thread layers are then arranged in a substantially T-shaped relationship wherein each leg of the T has a pair of adjacent woven thread layers from different fabric pieces. Transverse threads are woven through the bend portions of the thread layers and portions of the flat fabric piece that are adjacent the bend portions. This is accomplished by replacing the associated regulating members with the transverse thread. Thereafter, transverse threads are sequentially woven through adjacent woven thread layers by replacing adjacent regulating members of the adjacent thread layers with the transverse thread to couple the thread layers.

BRIEF DESCRIPTION OF THE DRAWINGS

The invention, together objects and advantages thereof, may best be understood by reference to the following description of the presently preferred embodiments together with the accompanying drawings in which.

DETAILED DESCRIPTION OF THE PREFERRED EMBODIMENTS

First Embodiment

The first preferred embodiment of the present invention will now be described referring to FIGS. 2 through 6. In this embodiment, as shown in FIGS. 2(a) to (d) and FIG. 3, a three-dimensional fabric F is formed into an almost L shape by two plate sections 1a and 1b. The two plate sections 1a and 1b are joined at a right angle bend 2. The plate sections 1a and 1b each comprise an x thread layer consisting of a first thread x, a y thread layer consisting of a second thread y, bias thread layers respectively consisting of bias threads B1 and B2 as planar threads, and a transverse thread z arranged perpendicular to the individual layers in the transverse direction of the fabric F for linking the layers to one another.

The first thread x is arranged along the bend 2 in a plane perpendicular to the transverse direction of the plate sections 1a and 1b. The second thread y is arranged in a direction perpendicular to the first thread x in a plane parallel to the x thread layer. The bias threads B1 and B2 are arranged to be inclined at a predetermined angle (45° in this embodiment) to the first and second threads x and y in a plane parallel to the x thread layer. In other words, the three-dimensional fabric F in this embodiment is a five-axis three-dimensional fabric wherein four of the axes are coplanar. The fabrics formed by the planar four-axis arrangement are coupled to one another by the transverse thread z. The x, y and bias thread layers of the plate sections 1a and 1b are each formed integrally by a thread arranged in a zigzag form. The second thread y and the bias threads B1 and B2 are each arranged across the bend 2 so that the threads y, B1 and B2 continuously lie over the plate sections 1a and 1b.

Figure 1:
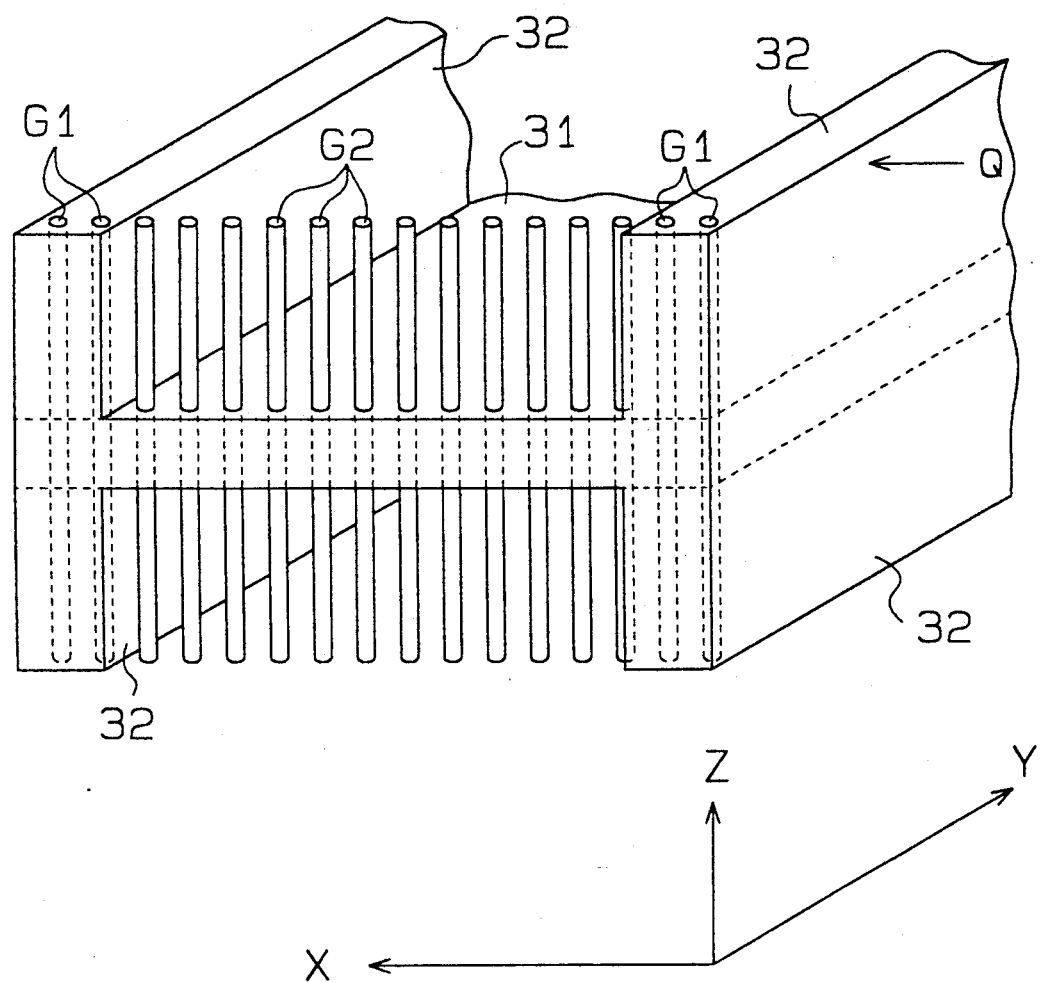
FIG. 1 is an exemplary perspective view illustrating a conventional three-dimensional fabric and how its guide pipes are arranged.
Figure 2A:
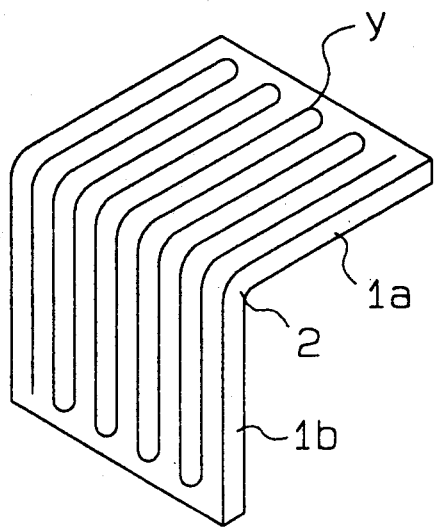
FIGS. 2(a) to (d) are schematic perspective views respectively showing the arrangement of the first, the second threads and bias threads according to a first embodiment of the present invention.
Figure 2B:
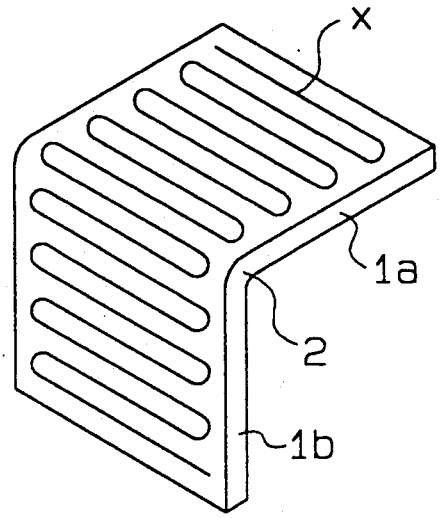
Figure 2C:
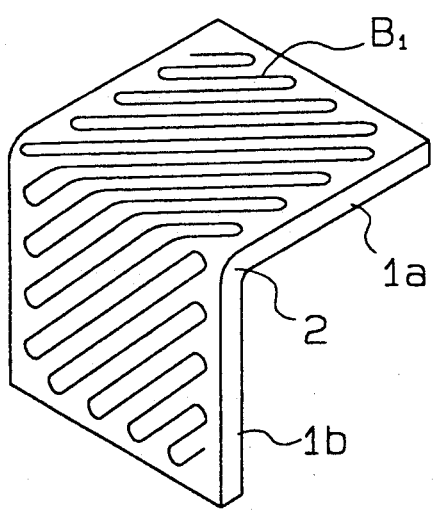
Figure 2D:
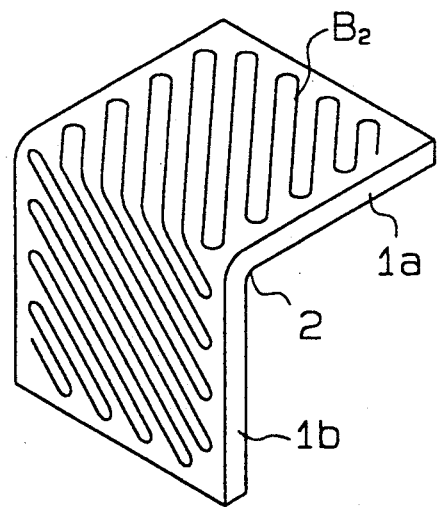
Figure 3:
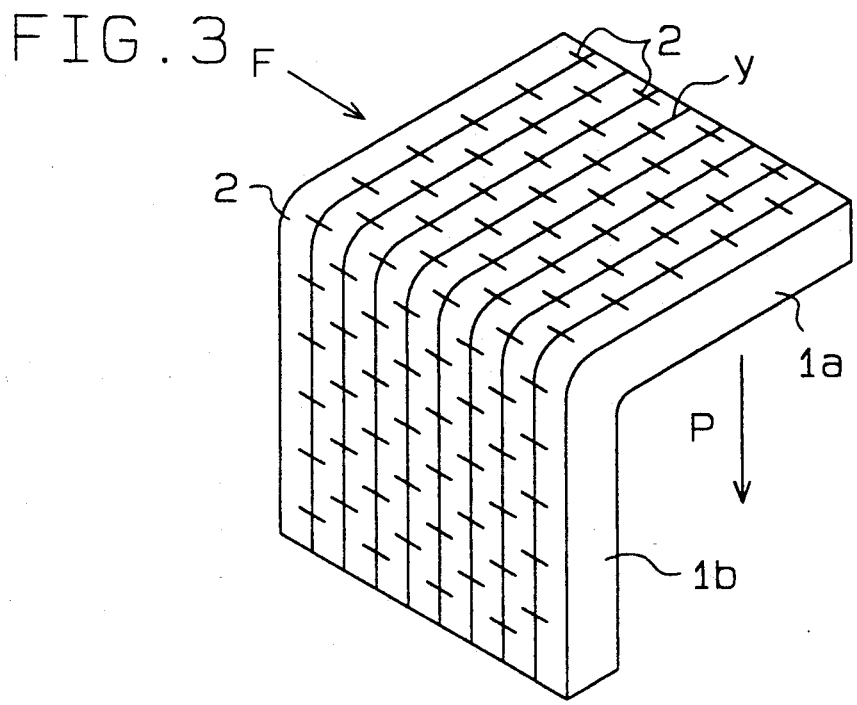
FIG. 3 is a schematic perspective view of the three-dimensional fabric shown in FIG. 2.

When a load is applied in the direction of an arrow P in FIG. 3 to a composite made of the thus structured three-dimensional fabric F impregnated with a resin, a great stress acts on the bend 2 of the three-dimensional fabric F. In this case, however, the second thread y and the bias threads B1 and B2 extend in a direction crossing the bend 2 and lie over the plate sections 1a and 1b. These threads (fibers) effectively contribute to dividing of a resisting force against the stress acting on the bend 2. The strength of the composite is therefore increased. Since the three-dimensional fabric F in this embodiment has a five-axis arrangement in all planes, the amount of deformation of the composite due to the stress in an oblique direction becomes less than that of the composite of the perpendicular three-axis arranged three-dimensional fabric used as a frame member. As a result, the composite in this embodiment shows high withstandability against twisting loads as well as the tensile and compression loads.

Figure 4:
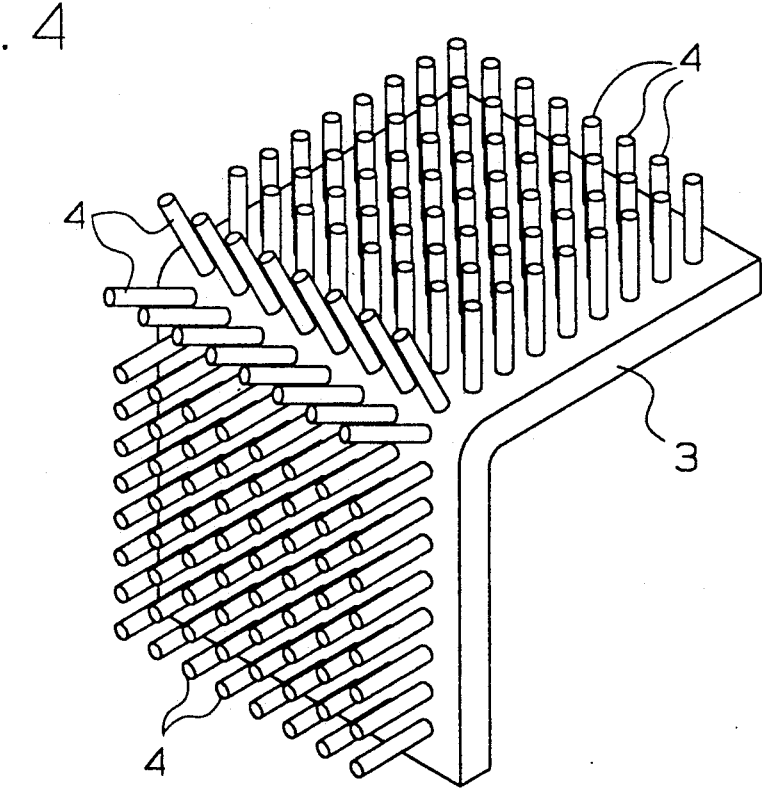
FIG. 4 is a schematic perspective view showing a frame used during weaving of the three-dimensional fabric shown in FIG. 3.

An example of a method of producing the three-dimensional fabric F will now be explained. As shown in FIG. 4, an L-shaped frame 3 corresponding to a three-dimensional fabric in shape is used to produce the three-dimensional fabric F. A plurality of pipes 4, serving as regulating members which regulate the arrangement of the threads, are provided upright at predetermined positions on the frame 3. As shown in FIGS. 5(a) to (d), the pipes 4 are removably fitted into bores 3a formed in the frame 3. A pair of notches 4a are provided at the proximal end of each pipe 4 so that the transverse thread z can pass through each of the notches 4a.

Figure 5A:
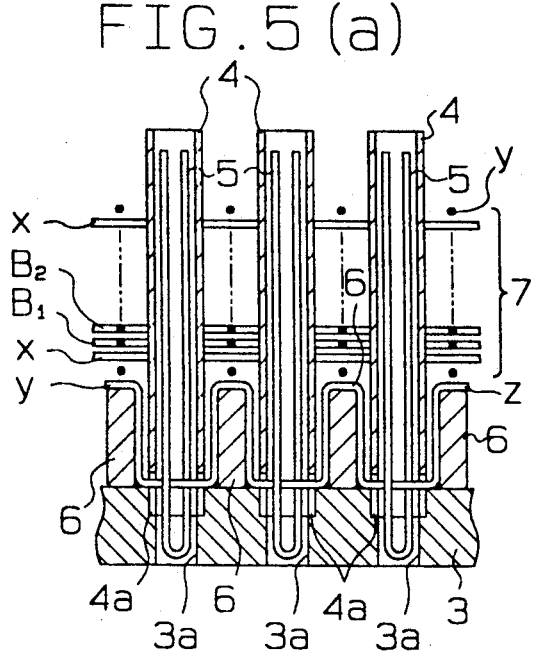
FIGS. 5(a) to (e) are schematic diagrams illustrating a method of inserting a transverse thread.

U-shaped pins 5 are inserted in the individual bores 3a before the pipes 4 are attached to the frame 3, and supports 6 are provided between the U-shaped pins 5. The transverse threads z are then threaded through the U-shaped pins 5 and over the blocks 6. One transverse thread z is provided for each row of U-shaped pins 5. Next, the pipes are simultaneously inserted into the respective bores 3a and over the U-shaped pins 5. Thus, the transverse thread z are received by the notches 4a. However, since the blocks effectively form spaces above the recesses 3, the insertion of the pipes pushes the transverse thread into the spaces. Consequently, the transverse thread z is arranged in a zigzag fashion as shown in FIG. 5(a). Accordingly, the necessary length of the transverse thread z will vary by selecting different thickness of the supports 6.

Under such conditions, the first and second threads x and y, and the bias threads B1 and B2 are woven between the gaps of the pipes 4 on the frame 3 so that these threads are looped about the outer surfaces of the pipes 4 provided on the end portion of the frame 3. The x thread layer, the y thread layer and the bias thread layers are therefore sequentially woven in the named order. The first thread x is arranged to be woven back and forth, extending in parallel to the bend 2 of the frame 3. The second thread y is arranged to be woven back and forth in a direction that extend perpendicular to the bend 2 of the frame 3. The bias threads B1 and B2 are woven back and forth in a diagonal manner. In this embodiment, the bias threads are woven in opposite directions, crossing the first and second threads x and y at angles of ±45° respectively, yielding a pair of bias thread layers whose bias threads cross the threads x and y in the opposite directions. After the desired number of thread layers are woven, the pipes 4 are replaced with the transverse thread z, which bind the individual layers together. The actual number of layers provided will be determined in accordance with the required strength of the composite member.

Figure 5B:
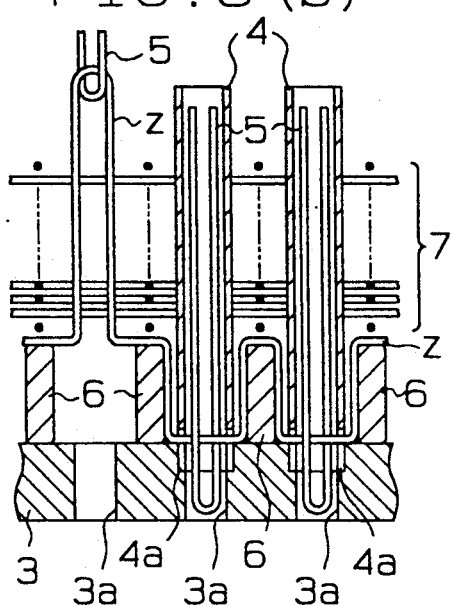
Figure 5C:
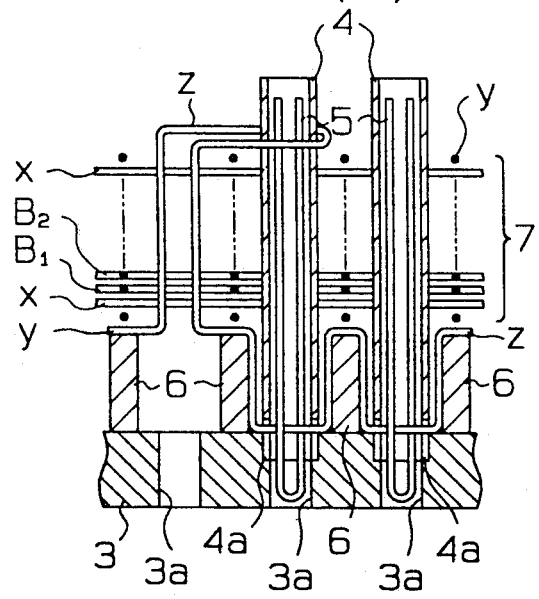
Figure 5D:
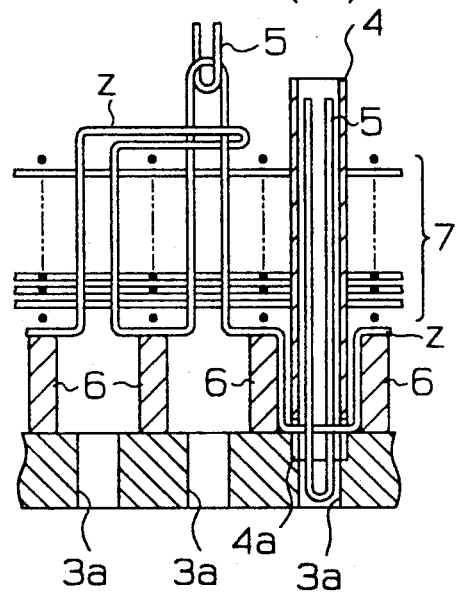
Figure 5E:
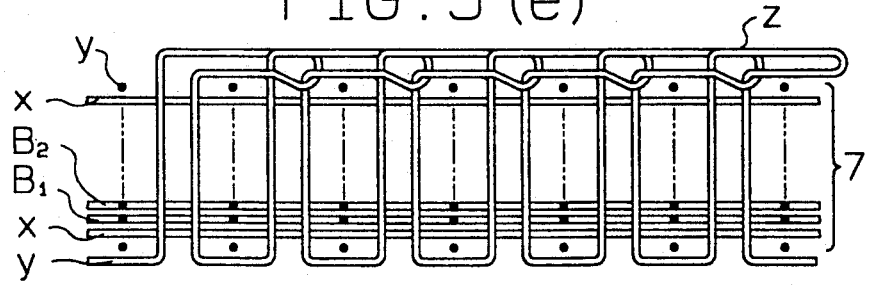

The replacement of the pipes 4 with the transverse thread z is carried out as follows. The pipe 4 located at the end portion of the frame 3 is removed from the bore 3a and a thread layer 7. The U-shaped pin 5 is pulled out of the bore 3a and the thread layer 7. Then, the portion of the transverse thread z which is positioned within the U-shaped pin 5 is pulled above the thread layer 7 in a loop as shown in FIG. 5(b). The U-shaped pin 5 is removed and the loop of the transverse thread z is wrapped around the adjacent pipe 4 as shown in FIG. 5(c). This pipe 4 is then removed in the same manner as described above. Next, as shown in FIG. 5(d), part of the transverse thread z is pulled in a loop together with the U-shaped pin 5 above the thread layer 7. As a result, the previous loop of the transverse thread z is prevented from coming off, and becomes tense to tighten the thread layer 7 in the transverse direction. Likewise, the remaining pipes 4 are sequentially replaced with the transverse thread z. Therefore, as shown in FIG. 5 (e), the individual thread layers constituting the thread layer 7 are coupled to one another by the transverse thread z.

Figure 6A:
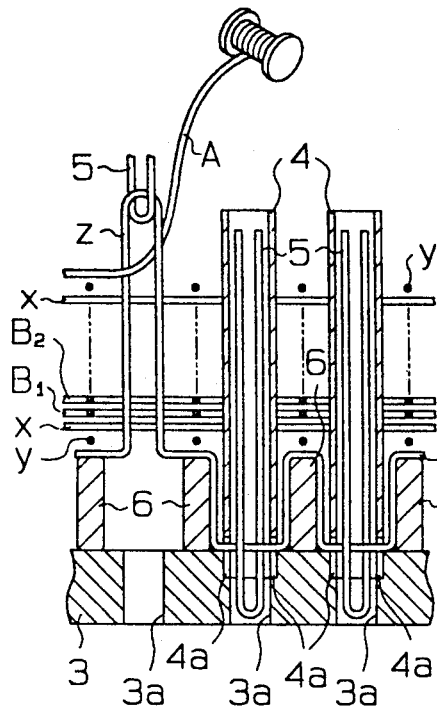
FIGS. 6(a) and (b) are schematic diagrams showing an alternative method of inserting the transverse thread.
Figure 6B:
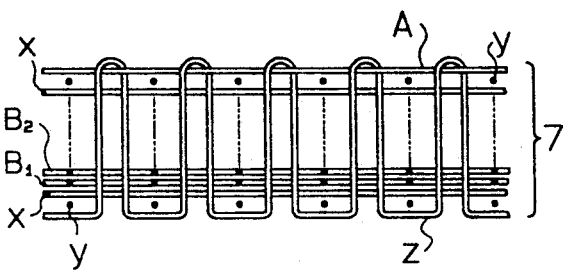

Alternatively, a selvage thread A may be put through the loop of the transverse thread z as shown in FIG. 6 (a) and (b) to prevent the loop from coming off after the replacement of the pipes 4.

Second Embodiment

Figure 7A:
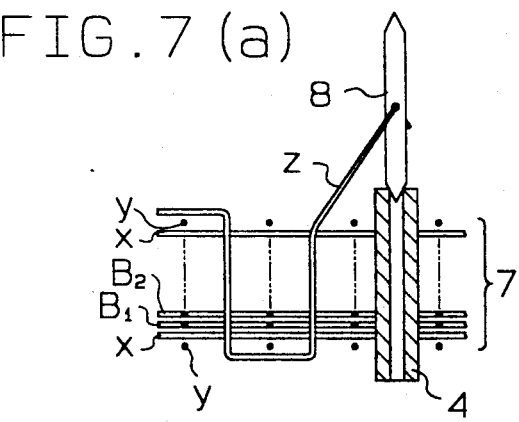
FIGS. 7(a) to (c) are schematic diagrams illustrating a method of inserting a transverse thread z according to a second embodiment of the invention.
Figure 7B:
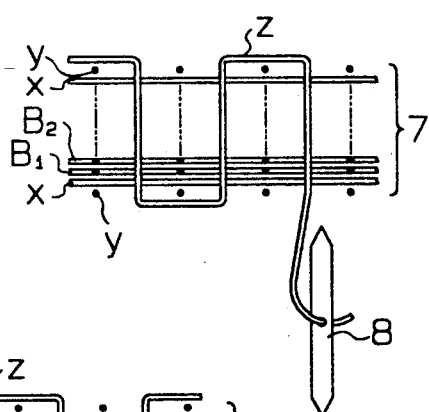
Figure 7C:
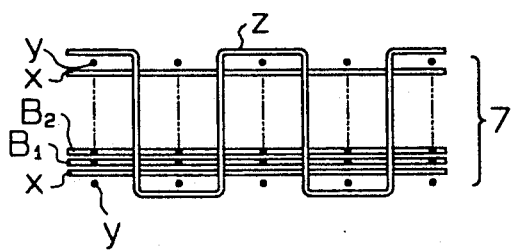

Another embodiment of the method of producing a three-dimensional fabric F will now be described referring to FIG. 7(a) to (c). This embodiment differs from the above-described embodiment in the method of inserting the transverse thread z. U-shaped pins 5 are not used in this embodiment, and pipes 4 are attached to a frame 3 without the transverse thread z arranged therein. The first and second threads x and y, and bias threads B1 and B2 are arranged in the same manner as in the first embodiment. The support plates 6 are located between the pipes 4. The individual threads are woven about the pipes as previously describe. That is, they are wrapped around the pipes 4 which are provided at the end portions of the frame 3. Again, by way of example, the thread layers may be sequentially laid in an order such as an x thread layer, a y thread layer and bias thread layers. After the required number of these layers are woven (as required by design considerations to provide the desired composite strength), the resultant thread layer 7 is removed together with the pipes 4 from the frame 3. Since the supports 6 are located between the frame 3 and the thread layer 7, the pipes 4 and the thread layer 7 can easily be removed from the frame 3.

The pipes 4 are then replaced with the transverse thread z using a needle 8 having the transverse thread z put through the needle's eye. The diameter of the needle 8 is the same as the outer diameter of each pipe 4. As shown in FIG. 7(a), distal end of the needle 8 is inserted in the pipe 4 and the two are pushed through the thread layer 7. Thus, the pipe 4 is pushed out of the thread layer 7. The needle 8 follows the pipe 4 as it is removed, so that the pipe 4 is replaced with the transverse thread z. Next, the distal end of the needle 8 is inserted into the adjacent pipe 4 from a direction opposite to that of pushing out the previous pipe 4. The same operation is repeated as was described in the previous procedure. Thus, the next pipe 4 is replaced with the transverse thread z. The remaining pipes 4 are sequentially replaced with the transverse threads z in the same manner. As a result, the individual layers constituting the thread layer 7 are linked to one another by the transverse thread z as shown in FIG. 7 (c). Unlike the previously described embodiment, U-shaped pins 5 and the transverse thread z do not need to be set when the pipes 4 are attached to the frame 3. Thus, in the method of this embodiment, the preparation for the weaving is simplified and the U-shaped pins 5 can be eliminated. This method can therefore reduce the number of elements necessary to produce the three-dimensional fabric F.

Third Embodiment

Figure 8:
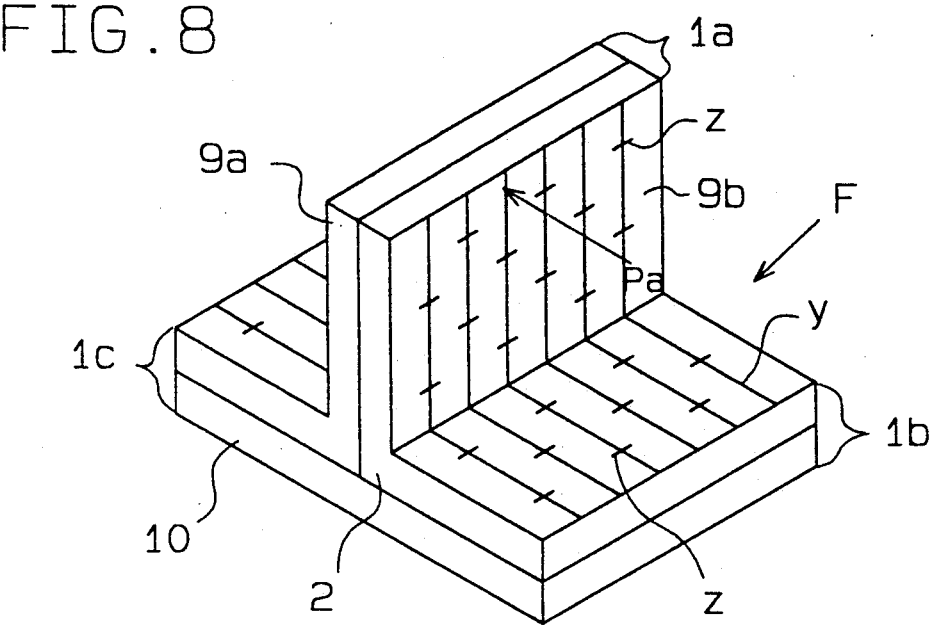
FIG. 8 is a schematic perspective view of a three-dimensional fabric according to a third embodiment.
Figure 9:
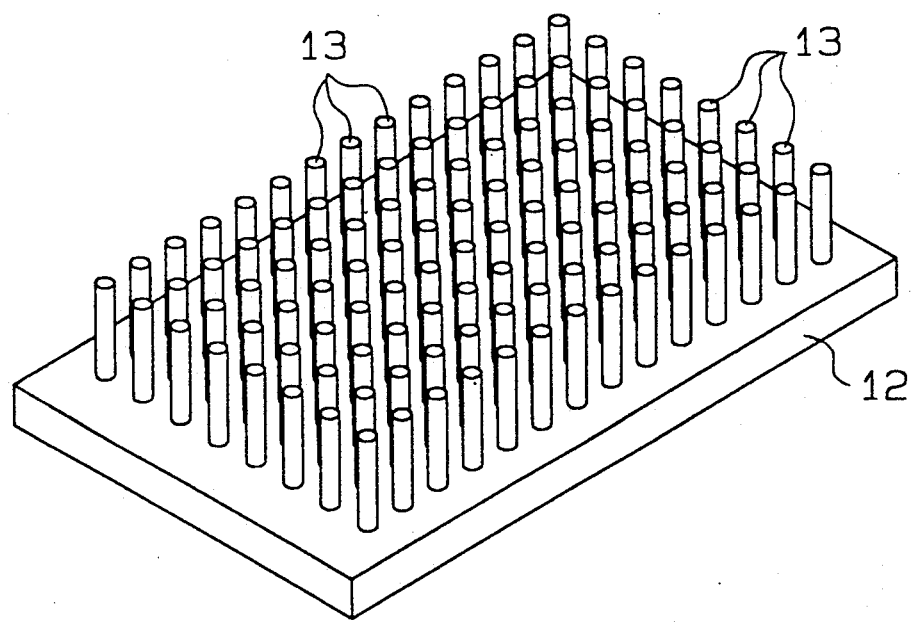
FIG. 9 is a schematic perspective view exemplifying a frame used for producing a three-dimensional fabric.
Figure 10:
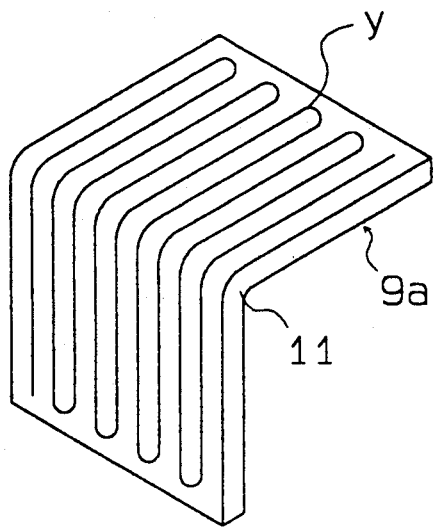
FIGS. 10(a) to (d) are schematic perspective views showing the state of arranging the first, the second threads and the bias threads, in one L-shaped fabric portion of a T-shaped joint arrangement.
Figure 10:
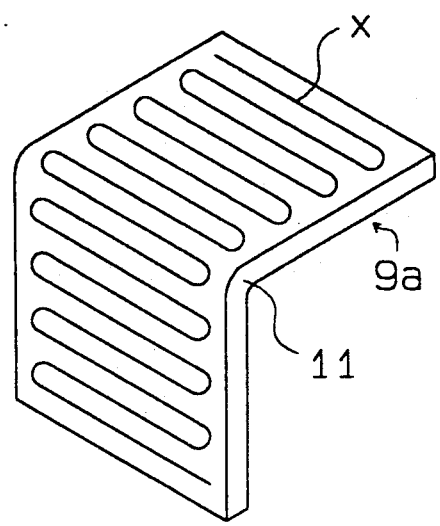
Figure 10:
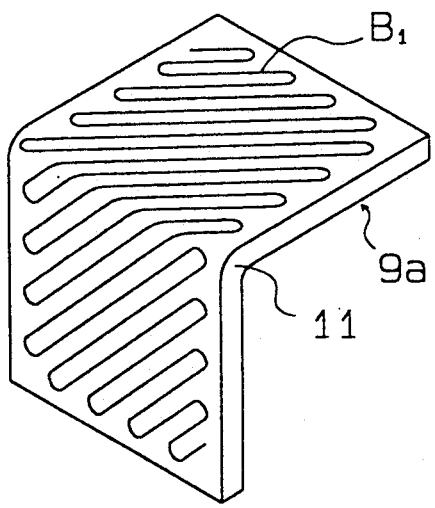
Figure 10:
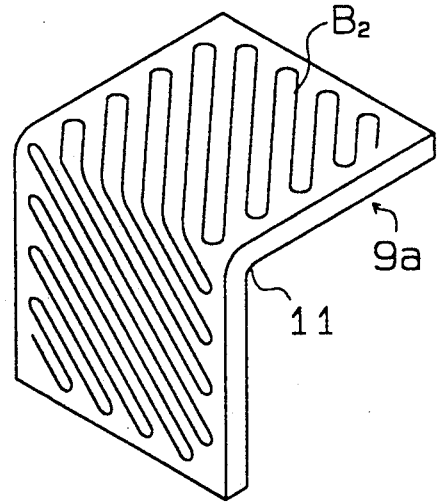

The third embodiment will now be explained referring to FIGS. 8 through 13. As shown in FIG. 8, a three-dimensional fabric F according to this embodiment is formed by a combination of a pair of L-shaped fabric pieces 9a and 9b, and a flat fabric piece 10. In effect, this results in a T-shaped structure having three plate sections 1a, 1b and 1c connected with one another at a junction (bend) 2. As shown in FIG. 10 (a) to (d), each of the fabric pieces 9a, 9b and 10 (only the fabric piece 9a is exemplified in FIG. 10) includes an x thread layer consisting of a first thread x arranged generally in parallel with the bend 2 of the plate sections 1a, 1b and 1c in a plane perpendicular to the transverse direction, a y thread layer consisting of a second thread y arranged in a direction perpendicular to the first thread x in a plane parallel to the x thread layer, bias thread layers respectively consisting of bias threads B1 and B2 arranged to be inclined at a predetermined angle (45° in this embodiment) to the first and second threads x and y in a plane parallel to the x thread layer, and a transverse thread z arranged orthogonal to the individual thread layers in the transverse direction of the three-dimensional fabric F for coupling the layers together.

Thus, as in the previous embodiment, the three-dimensional fabric F in this embodiment is a five-axis, three-dimensional fabric where fabrics having a planar four-axis arrangement are coupled to one another by the transverse thread z. The x and y thread layers and bias thread layers of the individual fabric pieces 9a, 9b and 10 are each formed integrally by a thread arranged in a zigzag fashion. In the case of the L-shaped fabric pieces 9a and 9b, for example, the first and second threads x and y, and the bias threads B1 and B2 are arranged respectively as shown in FIG. 10 (a) to (d). The second thread y and the bias threads B1 and B2 are each arranged across a bend 11 of the fabric pieces 9a and 9b so that the threads y, B1 and B2 continuously lie over their two planes which are located perpendicular to each other.

If a load is applied in the direction of an arrow Pa to a composite made of the three-dimensional fabric F impregnated with a resin, the second thread y and the bias threads B1 and B2 share the resisting force against the stress acting on the bend 2. In the third embodiment as well as in the previous embodiments, therefore, the amount of deformation of the composite due to the stress in an oblique direction becomes less than that of the composite of the perpendicular three-axis, three-dimensional fabric used as a frame member. As a result, the composite in this embodiment shows high withstandability against the twisting load as well as the tensile and compression loads.

An example of a method of producing this three-dimensional fabric F will be described below. Three frames are used to produce the three-dimensional fabric F. The frames are designed to have shapes corresponding to the shapes of a pair of L-shaped portions and a single flat plate section acquired by dividing the T-shaped portion of the three-dimensional fabric. More specifically, two frames 3 of an L shape similar to the frames 3 used in the previous embodiment and one frame 12 of a flat shape as shown in FIG. 9 are used. Many pins 13 serving as regulating members are provided upright at predetermined intervals on each of the frames 3 and 12.

With supports 6 located between the pins 13 as in the first embodiment, threads x and y and bias threads B1 and B2 are so arranged such that an x thread layer, a y thread layer and bias thread layers can be sequentially woven on each of the frames 3 and 12.

The threads x and y and the bias threads B1 and B2 are arranged on each L-shaped frame 3 in the same manner as in the previous embodiment. The first thread x to be arranged on the frame 12 woven back and forth in rows that extend substantially in parallel to the width direction of the frame 12. The second thread y is so arranged to be woven back and forth in the lengthwise direction of the frame 12. The bias threads B are arranged in a zigzag form so as to form an angle of 45° to both threads x and y, yielding a pair of bias thread layers whose bias threads have been arranged to cross the threads x and y in the opposite directions. The individual thread layers are sequentially woven on each of the frames 3 and 12 with the actual number of layers being determined in accordance with the demanded fabric strength. Thus, a thread layer 7 is produced.

Figure 11:
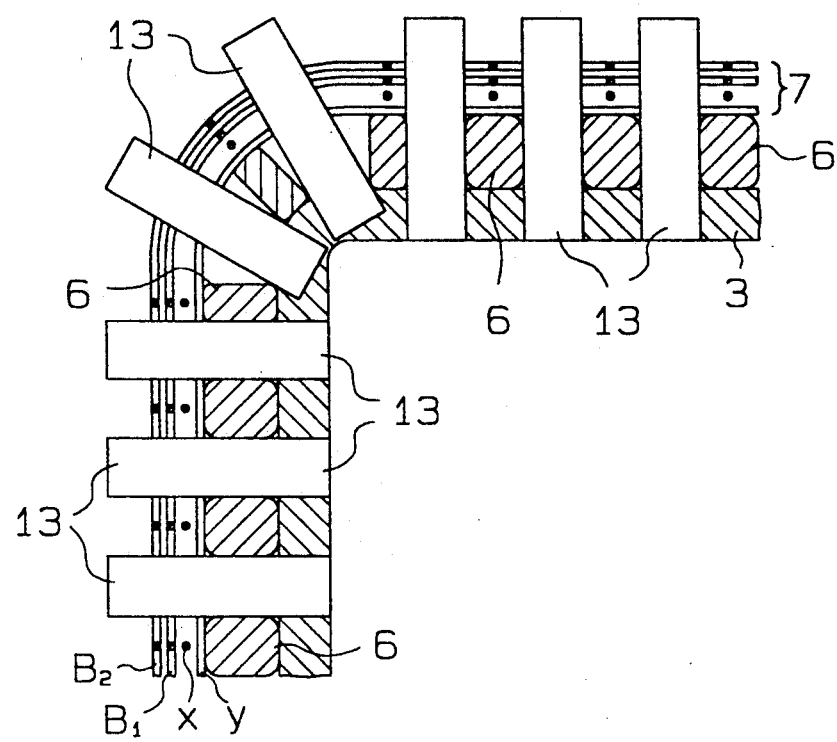
FIGS. 11(a) and (b) are schematic diagrams illustrating the relationship between a thread layer woven onto a frame and pins.
Figure 11:
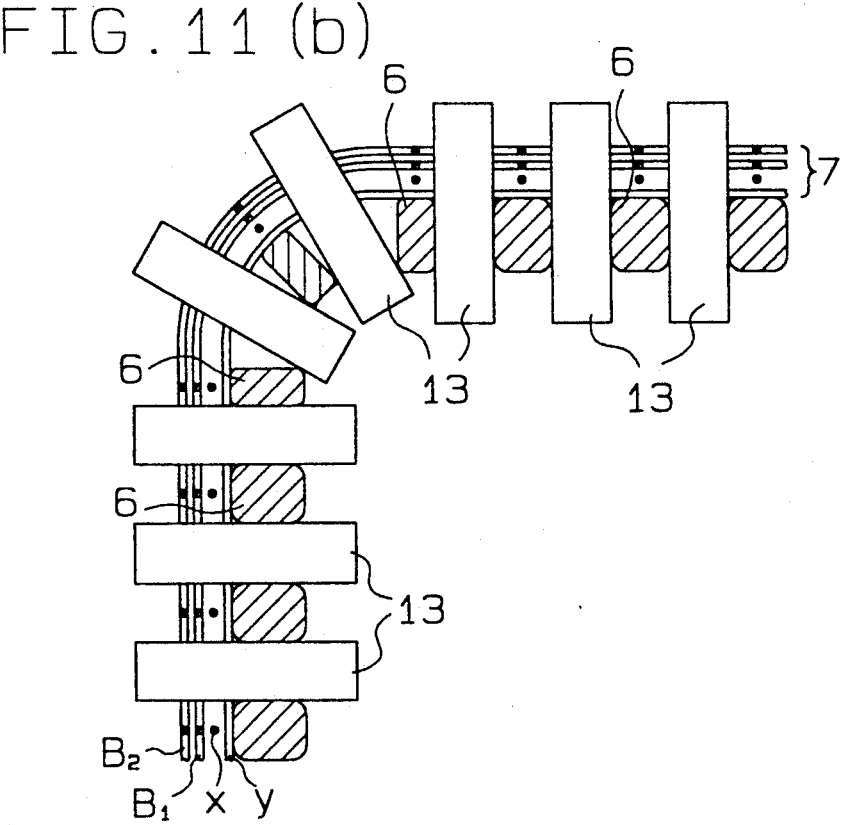
Figure 12:
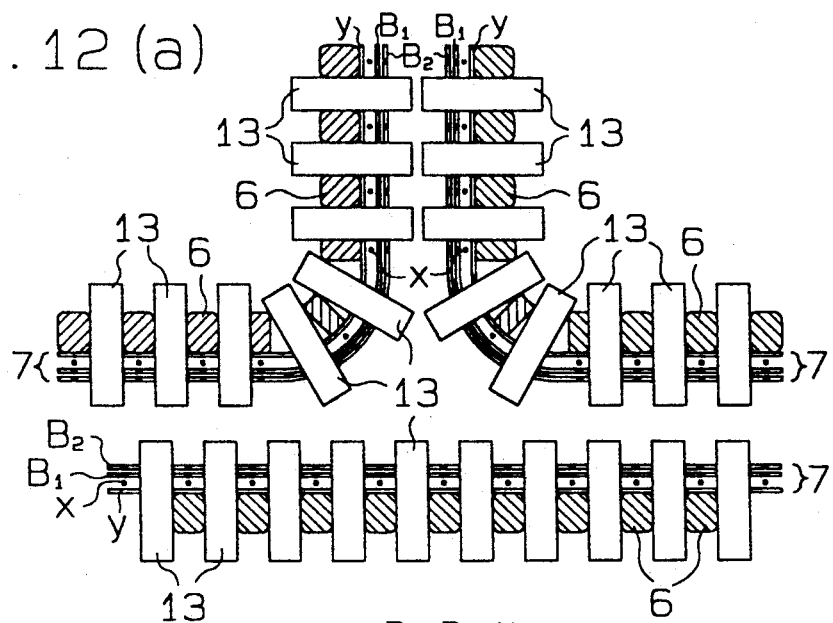
FIGS. 12(a) to (c) are schematic diagrams illustrating steps in a method for coupling thread layers from independent fabric pieces into a T-shaped joint.
Figure 12:
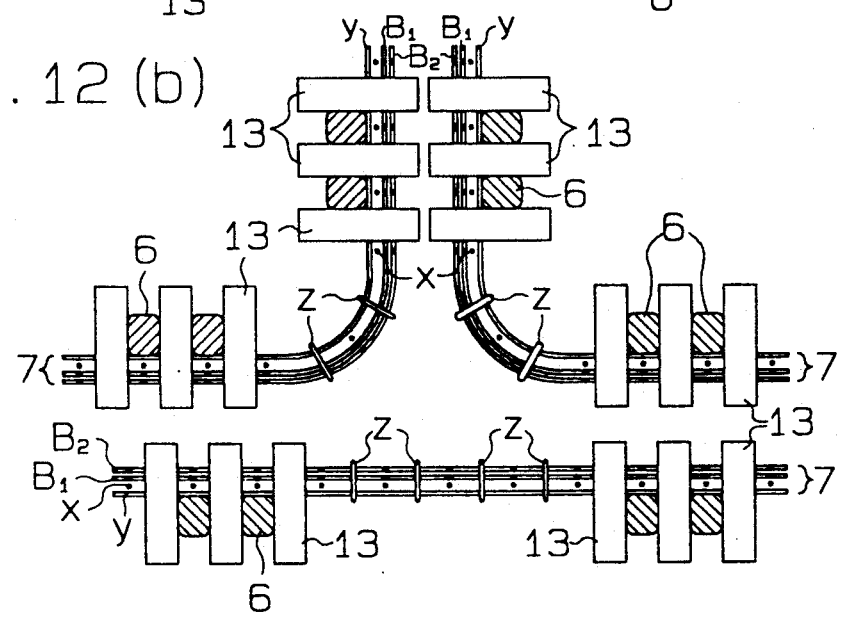
Figure 12:
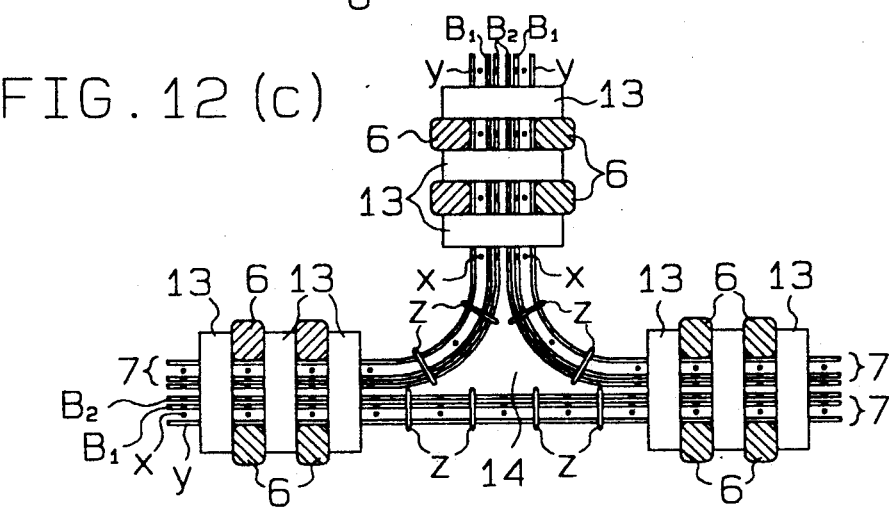

Next, as shown in FIG. 11 (a) and (b), the thread layers 7 are removed together with the pins 13 from the frames 3 and 12 (the illustration given only for the frame 3). The supports 6 present between each frame 3 and the thread layer 7 at this time facilitate the removal of the pins 13 and thread layer 7 from the frame 3. Then, the two L-shaped thread layers 7 removed from the frames 3 and one flat thread layer 7 removed from the frame 12 are arranged in a substantially T-shaped manner and combined to form the three-dimensional fabric F shown in FIG. 12(c).

Before combining the three thread layers 7, the pins 13 inserted into the bends of the L-shaped thread layers 7 are replaced with the transverse threads z. Further the pins 13 in the flat thread layer 7 that are positioned adjacent the bends of the L-shaped thread layers 7 are replaced with the transverse threads z. As a result, parts of the individual thread layers 7 are coupled by the transverse threads z, as shown in FIG. 12(b). Next, the pins 13 inserted into that portion of one L-shaped thread layer 7 which faces the other L-shaped thread layer 7 are pushed into the mating portion of the adjacent (latter) thread layer 7 to drive out the pins 13 therefrom. This couples the L-shaped thread layers 7 together. Subsequently, the connected thread layers 7 and the flat thread layer 7 are arranged in such a way that their associated pins 13 face one another. Then, both L-shaped thread layers 7 and the flat thread layer 7 are connected together by driving out those pins 13 of either the L-shaped thread layers 7 or the flat thread layer 7 with the pins 13 of the adjacent section.

Figure 13A:
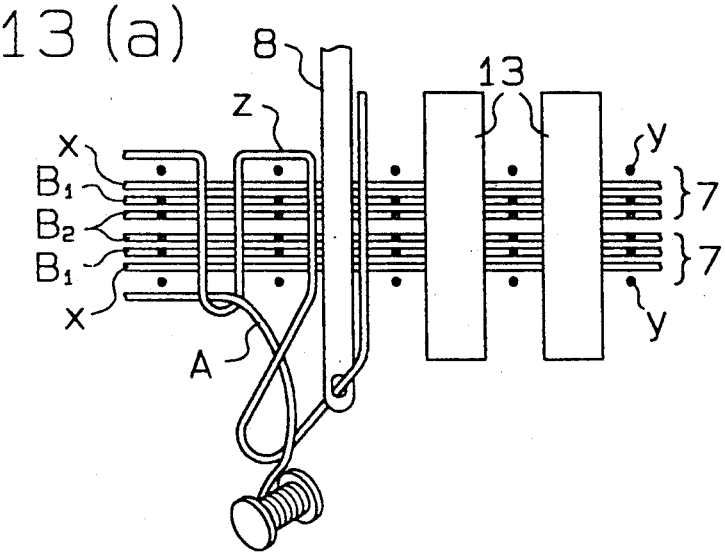
FIGS. 13(a) to (c) are schematic diagrams illustrating procedures of inserting a transverse thread z.
Figure 13B:
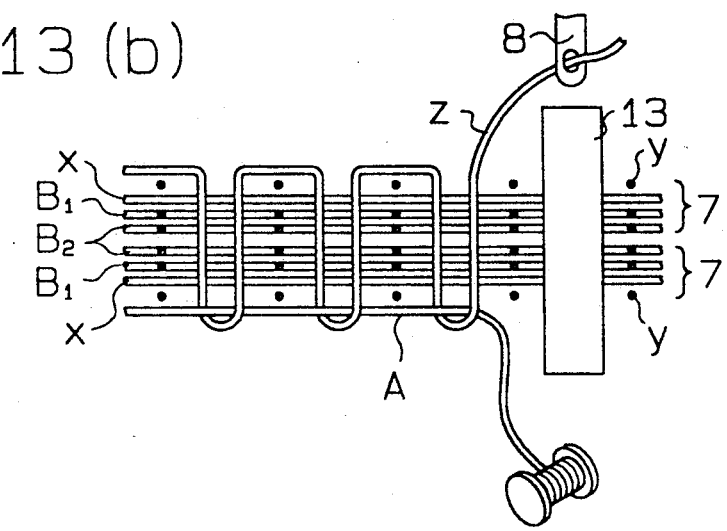

Next, a needle 8 is inserted in an end face of one of the pins and is pushed through the thread layers 7 so as to drive the pin 13 out of the thread layers 7. Thus, a loop of the transverse thread z is inserted through the gap left by the pin 13 as shown in FIG. 13(a). A selvage thread A is then inserted into the loop portion, the needle 8 is pulled up. As a result, the loop portion is tightened while it is prevented from coming out by the selvage thread A as shown in FIG. 13(b).

Figure 13C:
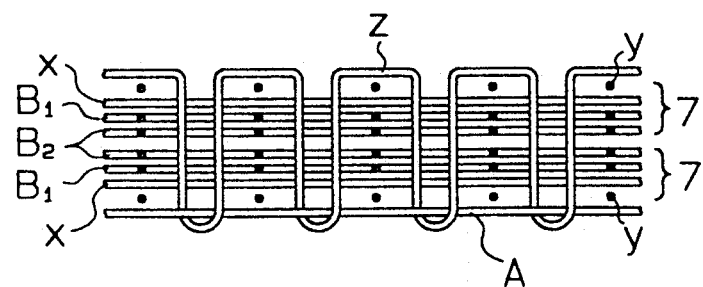

Thereafter, the same operation is repeated to sequentially replace the remaining pins 13 with the transverse thread z. Consequently, the individual thread layers constituting the thread layers 7 are connected together by the transverse threads z as shown in FIG. 13(c), yielding a three-dimensional fabric F. Since a gap 14 is formed in that portion where the bends of both L-shaped thread layers 7 correspond to the flat thread layer 7, a filler can be filled in the gap 14 as needed.

Figure 14A:
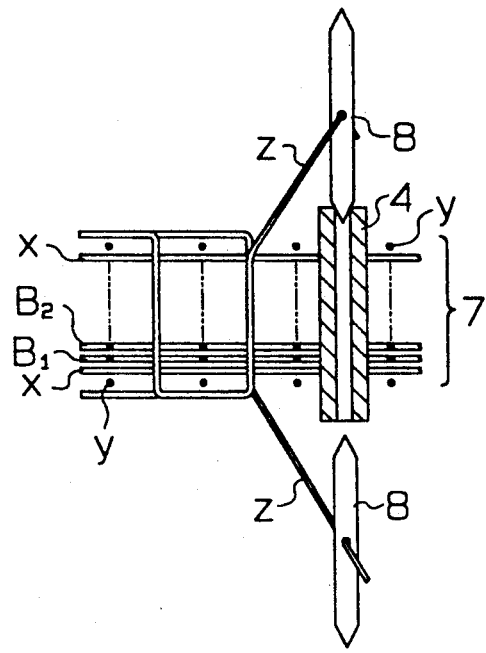
FIGS. 14(a) to (c) are schematic diagrams showing a modified method of inserting a transverse thread z.
Figure 14B:
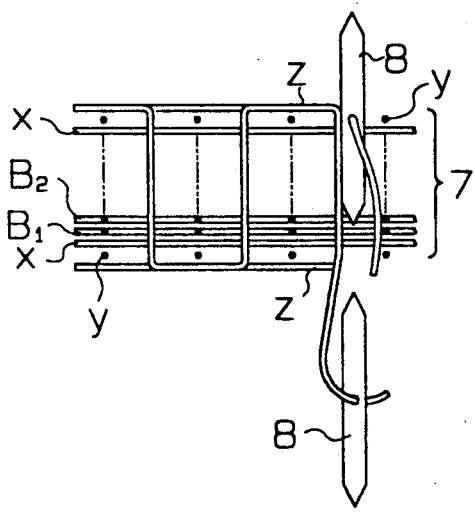
Figure 14C:
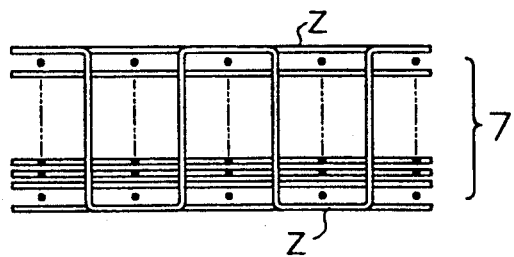
Figure 15:
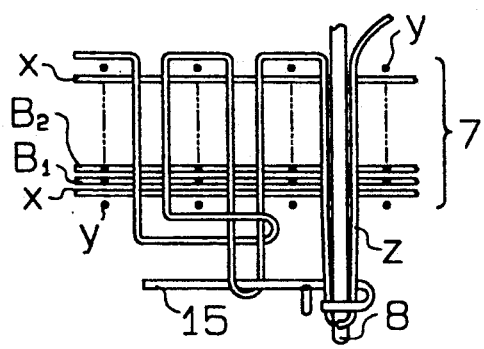
FIGS. 15(a) to (d) are schematic diagrams showing another modified method of inserting a transverse thread z.
Figure 15:
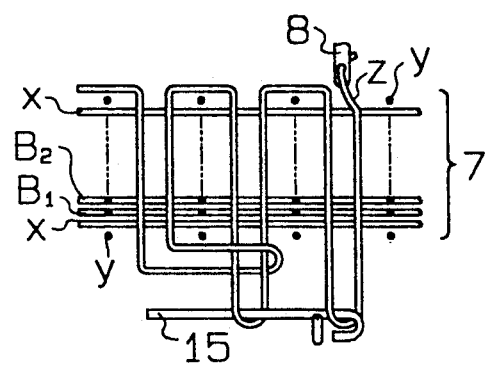
Figure 15:
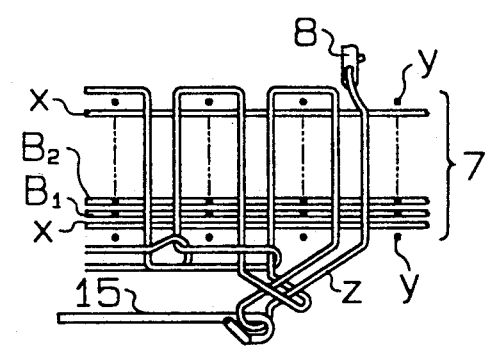
Figure 15:
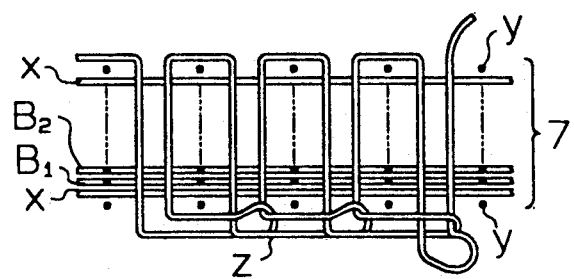
Figure 16:
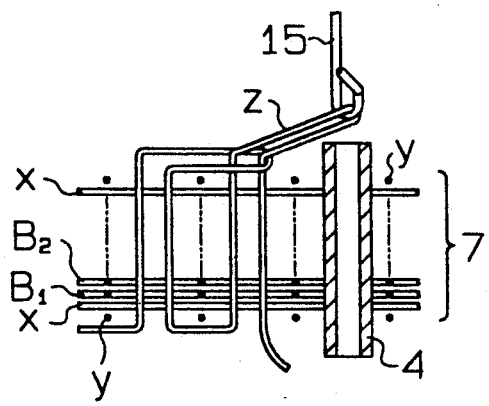
FIGS. 16(a) to (d) are schematic diagrams showing a further modified method of inserting a transverse thread z.
Figure 16:
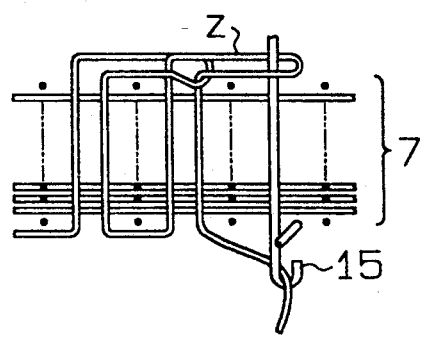
Figure 16:
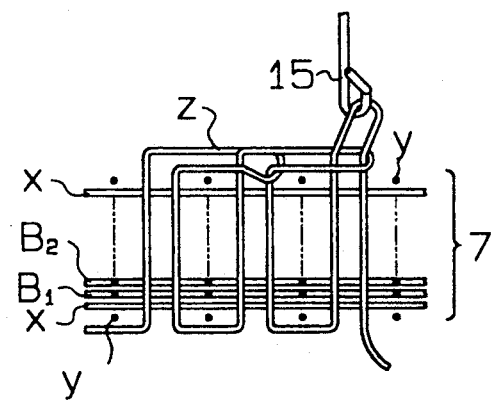
Figure 16:
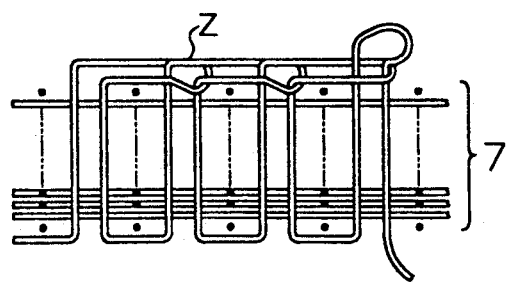

The present invention is not limited to the above-described embodiments, but may be modified in various other manners within the scope and spirit of the invention. For instance, instead of using the method of replacing the pipe 4 with the transverse thread z in the second embodiment, two needles 8 may be used to insert two transverse threads z in the same gap made by driving out the pipe 4, as shown in FIG. 14 (a) to (c). This method can connect the thread layers 7 tighter by the transverse threads z than that of the second and third embodiments.

Also a needle 8 with a hole in the tip may be used as shown in FIG. 15(a) to (d). In this case the needle 8 may be inserted from one thread layer 7 into the gap from which the pipe 4 has been removed to put a loop of the transverse thread z in the gap. This loop portion may be pulled through the previously formed loop portion by a hook 15, to provide a loop stopper. This operation can then be repeated for the remaining pipes 4.

Further, a hook 15 may be used as shown in FIG. 16(a) to (d). This hook 15 is used to drive out the pipe 4 from one thread layer 7 and hook the transverse thread z lying on the opposite side. As the hook 15 is pulled back, the transverse thread z is inserted in a loop into the gap made by removing the pipe 4 therefrom. The loop portion is put through the previously-formed loop portion, and this operation is repeated for the other pipes 4, providing loop stoppers.

Figure 17:
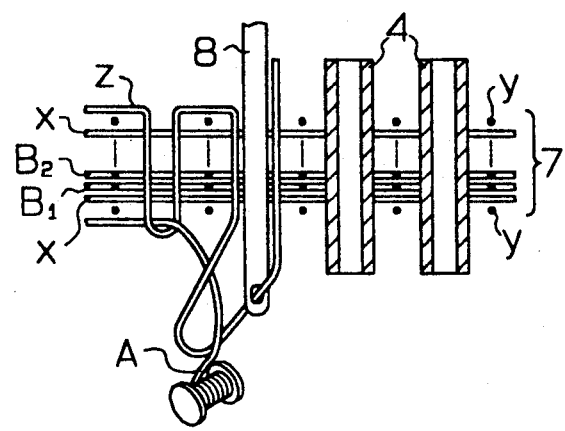
FIGS. 17(a) to (c) are schematic diagrams showing a still further modification of the method of inserting a transverse thread z.
Figure 17:
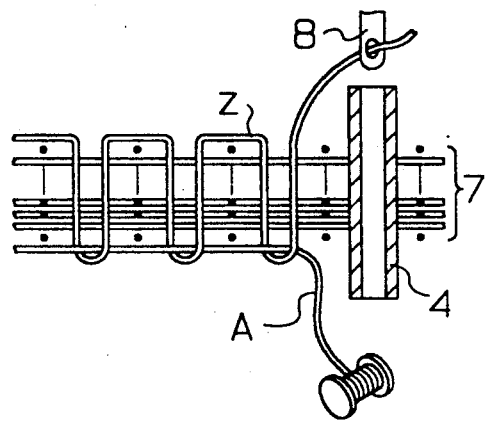
Figure 17:
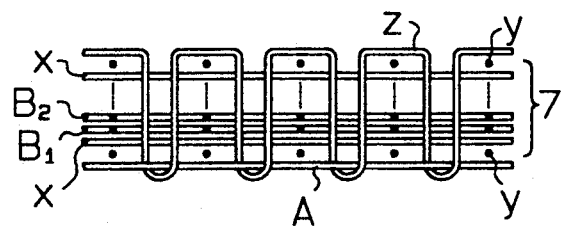

Furthermore, a needle 8 with a hole in the tip may be used as shown in FIG. 17(a) to (c). This needle 8 may be inserted from one thread layer 7 into the gap from which the pipe 4 has been removed to put the transverse thread z in a loop in the gap, with a selvage thread A then put through the loop portion to provide a loop stopper.

The pipes 4 used in the second embodiment and the above modifications may be replaced with pins.

The above-described different methods may be used to replace the regulating members with the transverse threads z in the three-dimensional fabric producing method according to the third embodiment as well.

The inclination angle of the bias threads B1 and B2 to the first and second threads x and y may be set to other than 45°. Each of the plate sections 1a, 1b and 1c of the three-dimensional fabric F may be designed to have a three-axis arrangement instead of a five-axis arrangement by eliminating the bias threads B1 and B2. The bias threads B1 and B2, constituting a pair of bias thread layers, may be arranged at an angle of 60° to the second thread y, with the first thread x unused, thereby providing a four-axis arrangement. While each of the threads x and y and the bias threads B1 and B2, constituting the respective thread layers, consists of a single thread in the described embodiments, they may consist of a plurality of threads.

Figure 18A:
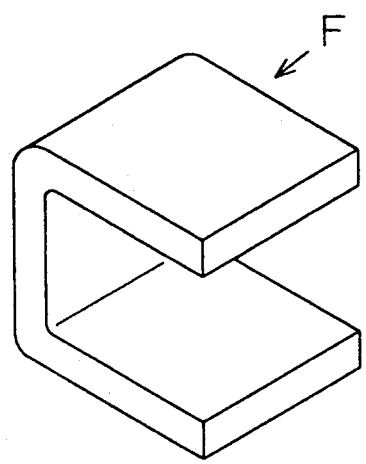
FIGS. 18(a) to (e) are schematic perspective views of three-dimensional fabrics having different shapes.
Figure 18B:
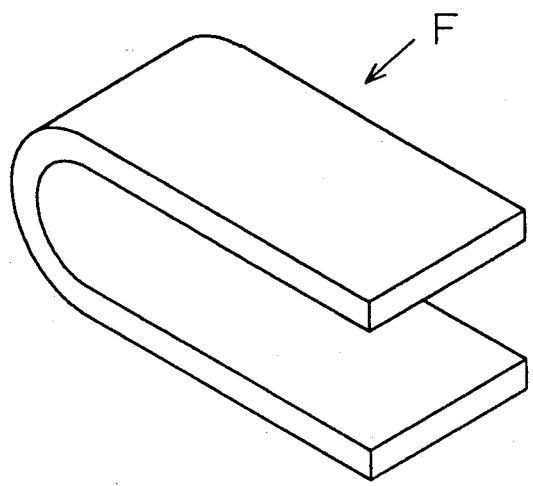
Figure 18C:
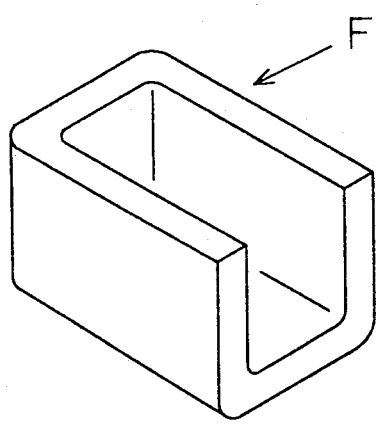
Figure 18D:
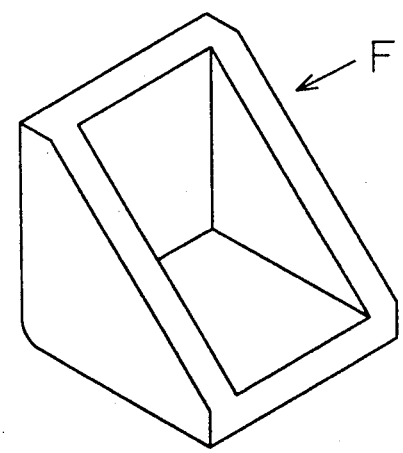
Figure 18E:
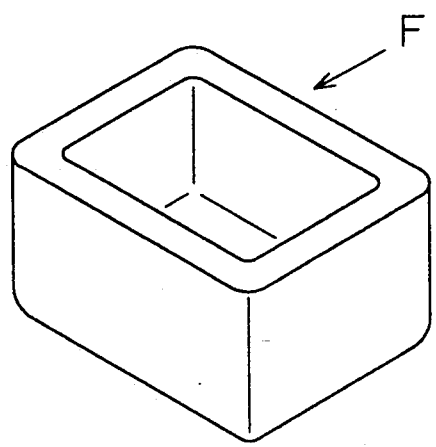
Figure 19A:
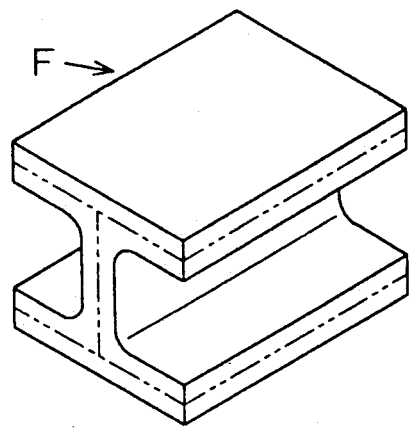
FIGS. 19(a) to (e) are schematic perspective views of three-dimensional fabrics having different shapes.
Figure 19B:
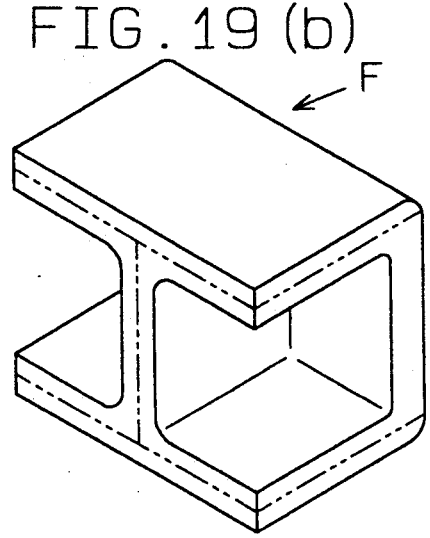
Figure 19C:
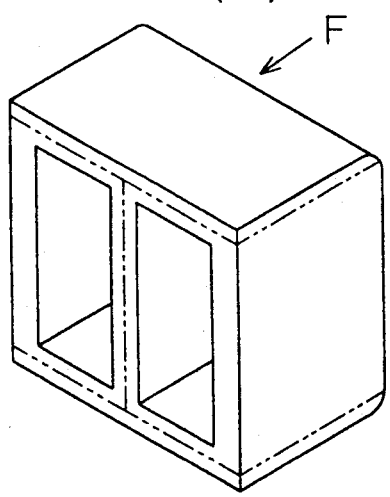
Figure 19D:
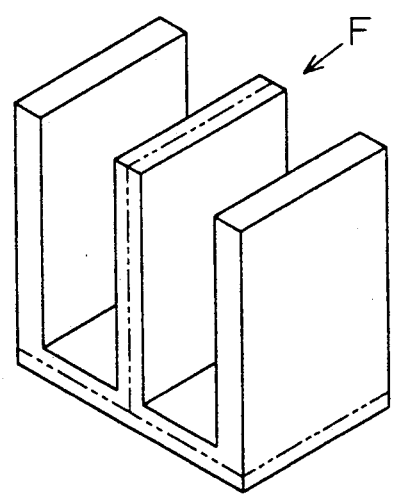
Figure 19E:
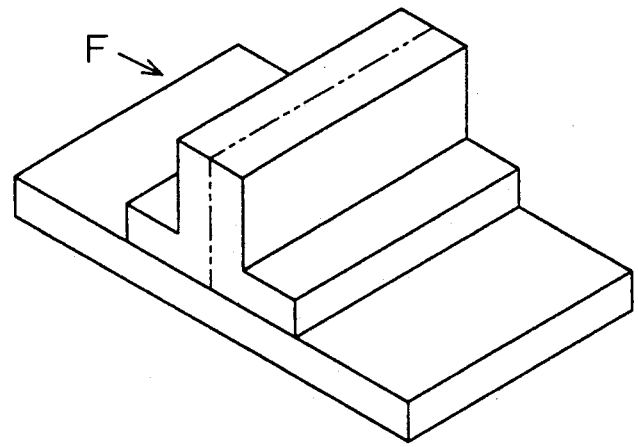

The three-dimensional fabric is not limited to have an L shape, but may be formed into a channel shape, a U shape or a box type as shown in FIG. 18(a), (b) and (e), respectively. The three dimensional fabric may also be designed to have partially-cut box shapes as shown in FIG. 18(c) and (d). Those three-dimensional fabrics F can be produced using frames having corresponding shapes with many pins or pipes attached thereto, in the same manner as done in the case of the three-dimensional fabric with an L shape.

Meanwhile, in the method of producing a three-dimensional fabric according to the third embodiment, before the individual thread layers 7 are arranged to correspond to the shape of the three-dimensional fabric, the regulating members which are not located to mate with those of the other thread layers as well as part of the regulating members located to have mating regulating members of the other thread layers may be replaced with the transverse threads z to couple part of the thread layers with the threads z. The shape of the three-dimensional fabric F is not limited to a T shape, but this method may be used to produce three-dimensional fabrics F with an I shape or the like, which have a bend formed by connecting a plurality of plate sections into a T shape as shown in FIG. 19 (a) to (e), for example. Such a three-dimensional fabric F can be produced using frames having shapes acquired by cutting the fabric along the alternate two short dash and one long line, with many pins or pipes attached to the frames, in the same manner as in the case of the above-described three-dimensional fabric F with a T shape.

What is claimed is:

1. A three-dimensional fabric comprising:
   at least two plate sections arranged in intersecting planes, there being a bend defined at the intersection of the plate sections;
   a plurality of thread layers that extend continuously through and between the plate sections, the threads of the thread layers within each plate section are arranged to extend in planes that are perpendicular to a transverse direction that passes through the corresponding plate section, the threads being woven in at least two independent directions; and
   at least one transverse thread woven through the thread layers in the transverse direction of the corresponding plate sections to couple the thread layers together.

2. A three-dimensional fabric according to claim 1, wherein the plurality of thread layers include:
   a first thread layer formed from a first thread that is woven in rows that are substantially parallel to the bend;
   a second thread layer formed from a second thread that is woven in columns that extend substantially perpendicular to the rows of the first thread layer; and
   a symmetrical pair of bias thread layers, the bias thread layers being woven in directions that are inclined relative to the rows of the first thread layer and the columns of the second thread layer.

3. A three-dimensional fabric according to claim 1 wherein the plate sections are substantially flat and intersect at a right angle.

4. A three-dimensional fabric according to claim 2 wherein a plurality of first thread layers, a plurality of second thread layers and a plurality of bias thread layer pairs are provided.

5. A three-dimensional fabric according to claim 4 wherein the plate sections are substantially flat and intersect at a substantially a right angle to form an L-shaped joint.

6. A three-dimensional fabric according to claim 1 wherein the three-dimensional fabric is composed of a plurality of fabric pieces and wherein a plurality of the fabric pieces have intersecting plate sections.

7. A three-dimensional fabric according to claim 6 wherein first and second ones of said fabric pieces include plate sections that intersect at right angles and a third one of said fabric pieces is substantially planar, the fabric pieces being arranged to form a T-shaped joint wherein first plate sections of said first and second fabric pieces abut one another and second plate sections of said first and second fabric pieces abut against the third fabric piece.

8. A three-dimensional fabric according to claim 1 wherein a multiplicity of plate sections are provided and arranged to provide a plurality of bends, the thread layers being arranged to pass through at least two adjacent plate sections.

9. A three-dimensional fabric according to claim 8 wherein the multiplicity of plate sections are divided into a plurality of fabric pieces, with each fabric piece having thread layers arranged to pass through and between at least two adjacent plate sections.

10. A three-dimensional fabric according to claim 8 wherein the thread layers are arranged to pass through and between at least three adjacent plate sections.

11. A three-dimensional fabric according to claim 10 wherein the thread layer wherein three of said adjacent plate sections are arranged in substantially a U-shape.

12. A three-dimensional fabric comprising:
first and second fabric pieces each including at least two substantially flat plate sections arranged in intersecting planes, wherein the intersection of adjacent plate sections define a right angle bend;
the first and second fabric pieces each have a plurality of thread layers that extend continuously through and between the adjacent sections, the portions of the thread layers within each plate section extending in planes that are perpendicular to a transverse direction that passes through the corresponding plate section, the plurality of thread layers including threads that are woven in at least two independent directions; and
at least one transverse thread woven through the thread layers in the transverse direction of the corresponding plate sections to couple the thread layers together.

13. A three-dimensional fabric as recited in claim 12 further comprising a third fabric piece having a substantially planar section, the first, second and third fabric pieces being arranged to form a T-shaped joint wherein first plate sections of said first and second fabric pieces abut one another and second plate sections of said first and second fabric pieces abut against the third fabric piece.

14. A three-dimensional fabric as recited in claim 13 wherein the plurality of thread layers include:
a first thread layer formed from a first thread that is woven in rows that are substantially parallel to the bend,
a second thread layer formed from a second thread that is woven in columns that extend substantially perpendicular to the rows of the first thread layer, and
a bias thread layer formed from a bias thread that is woven in a direction that is inclined relative to the rows of the first thread layer and the columns of the second thread layer.

15. A three-dimensional fabric according to claim 12 wherein a plurality of first thread layers, a plurality of second thread layers and a plurality of bias thread layers are provided.

16. A composite material that utilizes the three-dimensional fabric defined in claim 1 as its frame.

17. A method of producing a three-dimensional fabric having a plurality of plate sections connected into a T-shape joint, utilizing first and second frame members having L-shaped active portions and a third frame member having a substantially flat active portion the method comprising the steps of:
providing each frame member with a matrix of removable regulating members that extend perpendicularly to their respective active surfaces;
weaving threads between the regulating members of each frame member in at least two independent directions to form a thread layer, above the active surface of the corresponding frame, the L-shaped members being woven such that their thread layer extends continuously through a bend formed in the L-shaped member;
removing the thread layers together with the regulating members from their respective frames;
weaving transverse threads through the bend portions of the thread layers and portions of the flat fabric piece that are adjacent the bend portions, by replacing the associated regulating members with the transverse thread to couple the threads of the associated thread layer portion together;
arranging the woven thread layers in a substantially T-shaped relationship wherein each leg of the T has a pair of adjacent woven thread layers; and
sequentially weaving transverse threads through adjacent woven thread layers by replacing adjacent regulating members of the adjacent thread layers with the transverse thread to couple the thread layers.

18. A method as recited in claim 17, wherein the regulating members are pins.

* * * * *

UNITED STATES PATENT AND TRADEMARK OFFICE
CERTIFICATE OF CORRECTION

PATENT NO. : 5,211,967
DATED : May 18, 1993
INVENTOR(S) : Y. Yasui

It is certified that error appears in the above-indentified patent and that said Letters Patent is hereby corrected as shown below:

Column 2, line 56, after "directions" delete comma "," insert period --.--; before "which" insert --This forms a plate section arranged in four axial directions,--.

Signed and Sealed this

Tenth Day of May, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,211,967
DATED : May 18, 1993
INVENTOR(S) : Yasui et al

It is certified that error appears in the above-indentified patent and that said Letters Patent is hereby corrected as shown below:

Column 2, line 56, after "different" and before "directions," insert --directions. This forms a plate section arranged in four axial--; lines 57 and 58, after "fabric" in line 57, delete "directions, which resultants in a three-dimensional fabric".

Signed and Sealed this

Twentieth Day of September, 1994

Attest:

BRUCE LEHMAN

Attesting Officer

Commissioner of Patents and Trademarks